Patented June 24, 1952

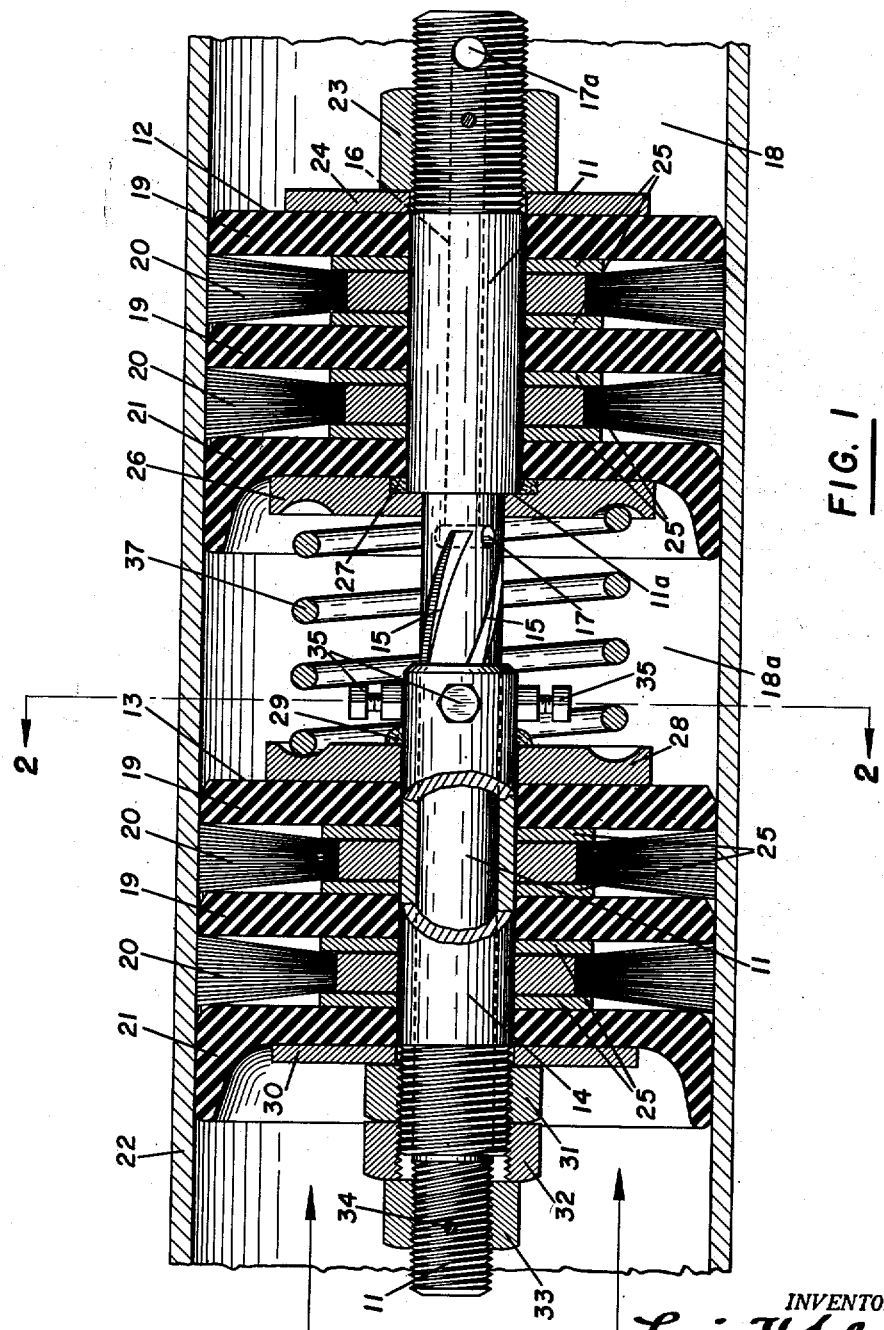

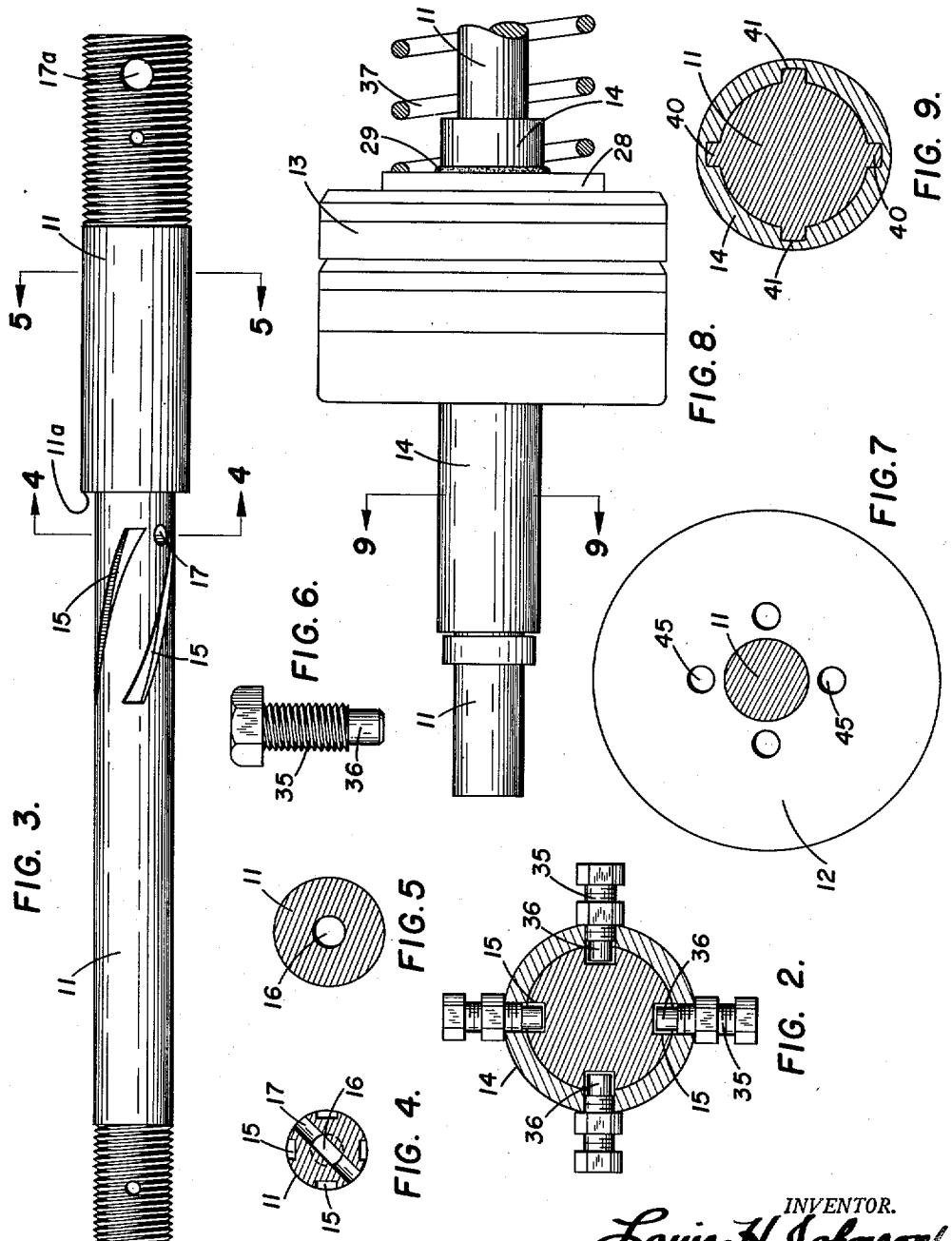

2,601,614

UNITED STATES PATENT OFFICE 2,601,614

PIPE-CLEANING DEVICE

Louis H. Johnson, Tomball, Tex.

Application May 25, 1950, Serial No. 164,246

8 Claims. (Cl. 15—104.06)

The present invention is directed to a device for cleaning pipe and pipe lines and is partcicularly directed to a device for removing obstructions from pipe lines carrying petroleum products and the like.

It is well known to the art that pipe lines, particularly those utilized for transporting oil great distances across country, often contain obstructions. If the line is assembled by welding, steel icicles or projections may extend into the pipe at the welds. Moreover, in welded pipe lines as well as pipe lines assembled with screw threads there may be burrs and obstructions such as pieces of timber and even dead animals. Pipe lines carrying fluid petroleum and the like may also have built up on interior surfaces thereof as they are used a layer of paraffin wax and this gradually accumulates and causes restriction of flow through the line to such extent as to require periodic cleaning. Pipe lines carrying petroleum products such as gasoline may be come corroded with rust and other materials which also restrict the flow of the gasoline through the pipe line and require periodic cleaning to remove the obstructions to the flow.

It is therefore the main object of the present invention to provide a device for cleaning pipes and pipe lines in which the device is moved by the fluid pressure.

Another object of the present invention is to provide a device which automatically frees itself when stopped by obstructions.

A still further object of the present invention is to provide a pipe cleaning device adapted to travel through pipe lines without severe erosion thereof.

Other objects and advantages of the present invention may be seen by a reading of the following description taken in conjunction with the accompanying drawing in which Fig. 1 is an elevation, partly in section, of an embodiment of the present invention arranged in a pipe;

Fig. 2 is a view taken along the lines 2—2 of Fig. 1;

Fig. 3 is a view of the longitudinal member of Fig. 1;

Fig. 4 is a view taken along the lines 4—4 of Fig. 3;

Fig. 5 is a view taken along the lines 5—5 of Fig. 3;

Fig. 6 is a detail of the pins of Figs. 1 and 2;

Fig. 7 is a still further embodiment of the invention showing another arrangement of conduits communicating the space between the two pistons of Fig. 1 to the space ahead of the first piston;

Fig. 8 shows a still further embodiment of the invention modifying the apparatus of Fig. 1 showing a different arrangement of the helical trackway and sleeve coacting therewith; and Fig. 9 is a view taken along the lines 9—9 of Fig. 8 showing the modified trackway of Fig. 1.

The principal parts of the apparatus include a longitudinal member 11 on which is mounted a first piston 12. A second piston 13 is mounted on a sleeve 14 which in turn makes a sliding fit with the longitudinal member 11. Means are provided to bias both of the pistons away from each other.

Referring now to the drawing and especially to Figs. 1-6, inclusive, numeral 11 designates a longitudinal member defining with its outer surface a plurality of helical grooves 15 and a conduit 16 provided with ports 17 which fluidly communicate the space 18a between pistons 12 and 13 with the space 18 immediately ahead of piston 12.

Pistons 12 and 13 may be made up of alternating segments of a deformable material such as natural or synthetic rubber or plastic material and annular abrasive surfaces. Thus, the pistons 12 and 13 may include a rubber disc 19, a wire brush 20, a second rubber disc 19 and a second wire brush 20. Piston 13 similarly will comprise a first deformable disc 19, a first wire brush 20, a second deformable disc 19 and a second wire brush 20. Each of the pistons is also provided with an annular sealing member made up of deformable materials such as natural or synthetic rubber or plastic which is indicated as 21. The pistons 12 and 13 are designed to fit snugly as shown in a pipe or pipe line 22 which is to be cleaned. The piston 12 may be mounted on the longitudinal member 11 as shown, being held firmly thereon by a hexagonal slotted nut 23 which bears frictionally against a steel plate 24 which, in turn, bears against the deformable disc 19. To provide rigidity to the pistons there may be arranged between the elements thereof spacer plates 25. A back-up plate 26 bears frictionally against the annular sleeve 21 and the former is welded annularly at ring 27 to a shoulder 11a of the longitudinal member 12. Piston 13 is similarly provided with spacer plates 25 and is connected to the sleeve 14 by a plate 28 which is welded thereto annularly by weld 29. Bearing frictionally against the sealing sleeve 21 of piston 13 is a plate 30 which, in turn, is held against the piston 13 by hexagonal nut 31, a collar locknut 32 and a nut 33 which holds the assembly in position on longitudinal member 11. The latter nut may be drilled and provided with a cotter pin 34. The sleeve 14 is provided with a plurality of pins 35 which protrude through the sleeve and the surface 36 thereof coacts with the grooves 15 defining helical trackways in the member 11. The pistons 12 and 13 are spaced away from each other as shown in the drawing and are provided with tension means illustrated by a coiled spring 37 attached at each end to pistons 12 and 13, which biases the pistons away from each other.

Referring now to Fig. 7, another embodiment of the invention with respect to the longitudinal member 12 is illustrated. In this cross sectional view piston 12 defines a plurality of bores 45 which communicate fluidly the space 18a occupied by spring 37 with space 18 ahead of the first piston 12. It will be seen also in this embodiment of my invention that the longitudinal member 11 does not define a conduit, but that a plurality of conduits 45 are defined by the piston 12 allowing the same end to be accomplished.

Referring to Figs. 8 and 9, another embodiment of the invention is illustrated wherein the helical trackway is defined by raised surface 40 on the longitudinal member 11 and the interior surface of the sleeve 14 defines recesses 41 which coact with the raised surfaces 40 to allow movement of the sleeve and therefore the second piston relative to the first piston.

In Fig. 8 the piston 13 is welded to the sleeve 14 at welds 29, but the sleeve 14 is extended backwardly and the longitudinal member 11 projects back of piston 13 a greater length than in Fig. 1. In this embodiment of my invention the portion of the longitudinal member 11 at the rear of piston 13 defines a plurality of helical trackways which are adapted to coact with interior surfaces of the sleeve 14 as shown in Fig. 9 or as shown in Fig. 1.

In the apparatus of the present invention described in the several embodiments in conjunction with the several figures of the drawing, power is provided for the assembly, including pistons 12 and 13, which is placed in pipe line 22, by fluid pumped therethrough, the fluid being flowed in the direction indicated by the arrows. As pressure is applied against the trailing edge 21 of piston 13, the whole assembly moves forward in pipe line 22 until it encounters an obstruction which resists forward movement of the assembly. When this happens the pressure exerted against piston 13 overcomes the resistance to forward movement of piston 13 by spring 37 and allows the piston 13 to move arcuately forward toward piston 12. Fluid trapped in the space 18a between pistons 12 and 13 is displaced therefrom through port 17, conduit 16 and port 17a into space 18 ahead of piston 12 allowing arcuate movement of piston 13 not to be resisted by compression of fluid in space 18a. As the piston 13 moves arcuately a hammer blow is delivered to piston 12 and torque is applied to piston 12 by the arcuate movement of piston 13 through spring 37, both ends of which are pressed against piston 13 and piston 12. This hammer blow causes at least arcuate movement of the piston 12 and allows at least partial rotation thereof freeing it from the obstructions in the pipe line 22 and allowing the assembly to move forward.

Thus, in the practice of my invention the pistons 12 and 13 are subjected to equal, if any, wear and are provided with automatic means of freeing same from obstructions from pipe lines which the device is adapted to clean.

The apparatus of the present invention has been used successfully in cleaning an 8-inch pipe line carrying gasoline extending over 125 miles of countryside. When the device encounters an obstruction an observer walking alongside of the pipe line has heard the hammer blow occurring when the device freed itself from and removed obstructions from pipe lines in which it was placed.

The nature and objects of the present invention having been completely described and illustrated, what I wish to claim as new and useful and to secure by Letters Patent is:

1. A device for cleaning the interior surface of pipe which comprises a longitudinal member defining with its outer surface at least one helical trackway, a first piston defining a peripheral abrasive surface fixedly mounted on a first end of said member, a sleeve slidably mounted on a second end of said member having an interior surface conforming to and engaging with said trackway and adapted to cause arcuate movement of said sleeve upon longitudinal movement of said sleeve on said member, a second piston fixedly mounted on said sleeve defining a peripheral abrasive surface, means for venting fluid from the space between said first and second pistons upon movement of said second piston toward said first piston, and tension means arranged between said pistons adapted normally to bias said pistons away from each other.

2. A device in accordance with claim 1 in which the first piston is arranged on a front end of said device and each of said pistons is followed by an annular deformable sealing sleeve.

3. A device in accordance with claim 2 in which the helical trackway is defined by grooves in said member.

4. A device for cleaning the interior surface of pipe which comprises a longitudinal member defining with its outer surface at approximately mid-point thereof a plurality of helical grooves, a first piston defining a peripheral abrasive surface fixedly mounted on a first end of said member, a sleeve slidably mounted on a second end of said member, a plurality of pins protruding through said sleeve and extending into said helical grooves, a second piston fixedly mounted on said sleeve defining a peripheral abrasive surface, means for venting fluid from the space between said first and second pistons upon movement of said second piston toward said first piston, a coil spring arranged between said pistons adapted to resist movement of said second piston relative to said first piston, and an annular deforming sealing sleeve arranged on said member and on said slidable sleeve following each of said pistons, the first piston being arranged on a front end of said device.

5. A device in accordance with claim 4 in which the peripheral abrasive surfaces comprise at least one annular wire brush.

6. A device in accordance with claim 5 in which the first and second pistons comprise at least one annular deformable disc and at least one annular wire brush.

7. A device for cleaning the interior surface of pipe which comprises a longitudinal member defining with its outer surface at approximately mid-point thereof a plurality of helical grooves, a first piston defining at least one annular deformable disc and at least one annular wire brush fixedly mounted on a first end of said member, a sleeve slidably mounted on a second end of said member, a plurality of pins protruding through said sleeve and extending into said helical grooves, a second piston fixedly mounted on said sleeve defining at least one annular deformable disc and at least one annular wire brush, a coil spring spatially arranged between said pistons to resist movement of said second piston toward said first piston, an annular deformable sealing sleeve arranged on said member and on said slidable sleeve following each of said pistons, the first piston being arranged on a front end of said device, and a conduit fluidly communicating the space between said pistons with a space ahead of said first piston.

8. A device in accordance with claim 7 in which the conduit is defined by said longitudinal member.

LOUIS H. JOHNSON.

REFERENCES CITED

The following references are of record in the file of this patent:

UNITED STATES PATENTS

| Number | Name | Date |
| --- | --- | --- |
| 176,197 | Rogers | Apr. 18, 1876 |
| 2,263,774 | Heltzel | Nov. 25, 1941 |

FOREIGN PATENTS

| Number | Country | Date |
| --- | --- | --- |
| 13,518 | Great Britain | of 1898 |